United States Patent [19]

Cowan et al.

[11] Patent Number: 5,284,513
[45] Date of Patent: Feb. 8, 1994

[54] CEMENT SLURRY AND CEMENT COMPOSITIONS

[76] Inventors: Kenneth M. Cowan, 1019 Sugardale Ct., Sugar Land, Tex. 77478; Arthur H. Hale, 7135 Hendon La., Houston, Tex. 77074

[21] Appl. No.: 964,975

[22] Filed: Oct. 22, 1992

[51] Int. Cl.$^5$ .................... C04B 7/147; C04B 7/153
[52] U.S. Cl. .................................................... 106/790
[58] Field of Search ............... 106/714, 719, 789, 790, 106/792, 823, 315, 770

[56] References Cited

U.S. PATENT DOCUMENTS

| | | |
|---|---|---|
| 2,649,160 | 8/1953 | Williams et al. |
| 2,822,873 | 2/1958 | Harmsen et al. |
| 2,880,096 | 3/1959 | Hurley |
| 2,895,301 | 7/1959 | Casagrande et al. |
| 2,938,353 | 3/1960 | Vorenkamp |
| 2,961,044 | 11/1960 | Shell |
| 3,021,680 | 2/1962 | Hayward |
| 3,168,139 | 2/1965 | Kennedy et al. |
| 3,412,564 | 11/1968 | McClintock |
| 3,499,491 | 3/1970 | Wyant et al. |
| 3,557,876 | 1/1971 | Tragesser |
| 3,670,832 | 6/1972 | Striegler |
| 3,675,728 | 7/1972 | Faulk et al. |
| 3,712,393 | 1/1973 | Sheldahl et al. |
| 3,724,562 | 4/1973 | Striegler |
| 3,820,611 | 6/1974 | King |
| 3,835,939 | 9/1974 | McEntire |
| 3,887,009 | 6/1975 | Miller et al. |
| 3,962,878 | 6/1976 | Hansen |
| 3,964,921 | 6/1976 | Persinski ........................... 106/719 |
| 4,037,424 | 7/1977 | Anders |
| 4,057,116 | 11/1977 | Striegler |
| 4,215,952 | 8/1980 | Baardsen |
| 4,252,471 | 2/1981 | Straub |
| 4,335,980 | 6/1982 | DePriester |
| 4,338,134 | 7/1982 | Graf zu Munster |
| 4,425,055 | 1/1984 | Tiedemann |
| 4,427,320 | 1/1984 | Bhula |
| 4,460,292 | 7/1984 | Durham et al. |
| 4,664,843 | 5/1987 | Burba, III et al. |
| 4,668,128 | 5/1987 | Hartley et al. |
| 4,674,574 | 6/1987 | Savoly et al. ..................... 106/719 |
| 4,720,214 | 1/1988 | Brasted et al. |
| 4,760,882 | 8/1988 | Novak |
| 4,761,183 | 8/1988 | Clarke |
| 4,790,954 | 12/1988 | Burba, III et al. |
| 4,880,468 | 11/1989 | Bowlin et al. |
| 4,897,119 | 1/1990 | Clarke |
| 4,913,585 | 4/1990 | Thompson et al. |
| 4,942,929 | 7/1990 | Malachosky et al. |
| 4,991,668 | 2/1991 | Rehm et al. |
| 5,016,711 | 5/1991 | Cowan |
| 5,020,598 | 6/1991 | Cowan et al. |
| 5,026,215 | 6/1991 | Clarke |
| 5,058,679 | 10/1991 | Hale et al. |
| 5,082,499 | 1/1992 | Shen ................................. 106/735 |
| 5,086,850 | 2/1992 | Harris et al. |
| 5,105,885 | 4/1992 | Bray et al. |
| 5,106,423 | 4/1992 | Clarke |
| 5,121,795 | 6/1992 | Ewert et al. |
| 5,123,487 | 6/1992 | Harris et al. |
| 5,125,455 | 6/1992 | Harris et al. |
| 5,127,473 | 7/1992 | Harris et al. |
| 5,133,806 | 6/1992 | Sakamoto et al. ............... 106/789 |

FOREIGN PATENT DOCUMENTS

| 0048454 | 3/1986 | Japan .................... 106/789 |
|---|---|---|
| 0833704 | 6/1981 | U.S.S.R. .................. 106/714 |

OTHER PUBLICATIONS

Chemical Abstract-85-144069/24 (Jul. 10, 1993) Japan.
Conversion of Drilling Fluids to Cements with Blast Furnace Slag-Performance Properties and Applications for Well Cementing SPE Paper 24575 (Oct. 4, 1992) Cowan et al.
"Deep Cement Mixing Experience in Japan", by G. Dennis et al, Copyright 1985 Seabed Strengthening Symposium, Denver, Co., Jun. 4, 1985, TP 85-5.
"Mud Disposal: An Industry Perspective", Hanson et al, Drilling, May 1986, pp. 16-21.
"Waste Minimization Program Can Reduce Drilling Costs", Hall et al, Oryx Energy Co., Houston, Tex., Oil & Gas Journal, Jul. 1, 1991, pp. 43-46.
"Phosphoric Acids and Phosphates", Kirk-Othmer Enc. of Chemical Technology, 3rd Ed., vol. 17, p. 477.
"Quantitative Interpretation of X-Ray Diffraction Patterns of Mixtures.I.Matrix-Flushing Method for Quantitative Multicomponent Analysis" by Frank H. Chung, J. Appl. Cryst. (1974) 7, pp. 519-525.

*Primary Examiner*—Mark L. Bell
*Assistant Examiner*—Paul Marcantoni

[57] ABSTRACT

A cement slurry composition is provided comprising blast furnace slag, water and salt, and a hydraulic material comprising blast furnace slag and salt, and a cured cement therefrom. These compositions are particularly useful in cementing wellbores within salt formations because salt saturated cement slurries can be prepared without the need for expensive additives.

20 Claims, No Drawings

CEMENT SLURRY AND CEMENT COMPOSITIONS

FIELD OF THE INVENTION

This invention relates to salt water cement slurries, hydraulic compositions and cements resulting from curing of such slurries and hydraulic compositions.

BACKGROUND OF THE INVENTION

For over 90 years, annuli between on oil and gas well casing and the surrounding borehole have been cemented to prevent vertical communication of formation fluids inside the borehole. Particular difficulties have occurred in cementing wellbores when the wellbore penetrates salt or potash formations. Cement slurries that are not salt saturated have been known dissolve a portion of the formation as the cement slurry sets leaving voids and poor bonding between the cement and the salt formation. Salt saturated water has therefore been used in the preparation of cement slurries for cementing within salt formations such as sodium chloride and potassium carbonate formations. Salts generally retard setting of Portland type cements, and reduce the effectiveness of many common cement additives for Portland cement slurries. The set cements also do not have as high of a compressive strength as Portland cements prepared from fresh water. Additional setting accelerators and additives have therefore been required that increase the cost of such cements. Such salt water Portland cement slurries are therefore relatively expensive. Such salt water Portland cement slurries can also be difficult to formulate due to interactions between the salt and the many cement additives required.

Even when a salt saturated cement slurry is not required, salt water is often convenient to use. In such cases, it may be desirable to have a cement composition that can be prepared using salt water such as sea water or brine. Further, economical high strength cement slurries and cured cement compositions have a multitude of utilities such as construction and road paving.

It is therefore an object of this invention to provide an salt water cement slurry and a cured cement having a high compressive strength.

It is a further object of this invention to provide a blast furnace slag based cement with superior strength.

It is a further object of this invention to provide such a cement slurry and cured cement that can be prepared from drilling fluids in a preferred embodiment.

SUMMARY OF THE INVENTION

These and other objects are accomplished by a cement slurry composition comprising blast furnace slag, water, and salt; a hydraulic composition comprising blast furnace slag and salt; and a cured cement from this slurry or hydraulic composition. The use of salt in slag cement slurries can considerably increase the compressive strength of the resultant cured cement. This is a particularly unexpected result in light of the detrimental effect of salt on the compressive strengths of Portland cements.

Strength and ductility of blast furnace slag based cements is also considerably improved by inclusion of crosslinkable polymers in the cement slurry. Acid functionalized polymers that can be crosslinked by complexing with metal ions are therefore preferably included in the cement slurry composition of the present invention. The ductility imparted by these polymers is particularly useful when a well casing is cemented into a salt formation due to the slow creep movement around the wellbore.

DETAILED DESCRIPTION OF THE INVENTION

Blast Furnace Slag

Blast furnace slag is the hydraulic refuse from the melting of metals or reduction of ores in a furnace as disclosed in Hale and Cowan, U.S. Pat. No. 5,058,679 (Oct. 22, 1991), the disclosure of which is hereby incorporated by reference.

The preferred blast furnace slag used in this invention is a high glass content slag produced by rapidly quenching a molten stream of slag from a temperature of between 1400° C. and 1600° C. through intimate contact with large volumes of water. Quenching converts the stream into a material in a glassy state having hydraulic properties. At this stage it is generally a granular material that can be easily ground to a desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a surface area between 500 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably between 4,000 $cm^2/g$ and 9,000 $cm^2/g$ all as Blaine specific surface areas. An available blast furnace slag which fulfills these requirements is marketed under the trade name "NEWCEM" by the Blue Circle Cement Company. This slag is obtained from the Bethlehem Steel Corporation blast furnace at Sparrows Point, Maryland.

A usual blast furnace slag composition range in weight percent is: $SiO_2$, 30–40; $Al_2O_3$, 8–18; CaO, 35–50; MgO, 0–15; FeO, 0–1; S, 0–2 and manganese oxides, 0–2. A typical specific example is: $SiO_2$, 36.4; $Al_2O_3$, 16.0; CaO, 43.3; MgO, 3.5; FeO, 0.3; S, 0.5; and manganese oxides <0.1.

Blast furnace slag having relatively small particle size is frequently desirable because of the greater strength imparted by such blast furnace slags in many instances to a final cement. Characterized in terms of particle size the term "fine" can be used to describe particles in the range of 4,000 to 7,000 $cm^2/g$ Blaine specific surface area, corresponding to about 16 to 31 microns in size. "Microfine" can be used to describe those particles in the 7,000 to 10,000 $cm^2/g$ Blaine specific surface area range that corresponds to particles of about 5.5–16 microns in size and "ultrafine" can be used to describe particles over about 10,000 $cm^2/g$ Blaine specific surface area that correspond to particles 5.5 microns and smaller in size.

However, it is very time consuming to grind blast furnace slag to these particles sizes and it is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, and even the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 20 wt %, more preferably 5 to 8 wt % can be ground to the ultrafine particle size and the remainder ground in a normal way thus giving particles generally in a size range of greater than 11 microns, the majority of the remaining being in the 11 to 31 micron range.

Different blast furnace slags vary in susceptibility to salt increasing compressive strength of the set cements. Blast furnace slag having about a 10,040 cm$^2$/g Blaine specific surface area available from Koch Minerals of Wichita, Kansas, under the tradename "WELL-CEM", and "NEWCEM" blast furnace slag available from Blue Circle Cement Company of Sparrows Point, Maryland, having about a 5,500 cm$^2$/g Blaine specific surface area demonstrate significant improvement in strength when slurried in salt containing water. "MICROFINE MC-100", a blast furnace slag available from Geochem having about 10,990 cm$^2$/g Blaine specific surface area does not demonstrate an increase in strength when blended with salt water, but is not detrimentally affected by blending with salt saturated water. Most blast furnace slags do demonstrate improved compressive strengths when blended with salt waters, and the effect of salt water on the available blast furnace slags can be readily determined through routine experimentation. It is preferred that the blast furnace slag of the present invention be one that exhibits about 20 percent or more increase in compressive strength when blended with sodium chloride saturated water as opposed to fresh water, and that the slurry be saturated with sodium chloride.

The total amount of cementitious material in the cementitious slurry will typically range from about 20 lbs/bbl to about 600 lbs/bbl, preferably 50 lbs/bbl to 500 lbs/bbl, most preferably 100 lbs/bbl to 350 lbs/bbl.

Salts

The water used to prepare the cement slurries preferably contains enough salt to result in 5 percent by weight or more of salt in the resultant slurry The water is more preferably salt saturated. The preferred salt is sodium chloride, but any of the salt discussed herein as being useful in drilling fluids are acceptable. For example, NaCl, NaBr, KCl, KBr, CaCl$_2$, MgCl$_2$, NaNO$_3$, KNO$_3$, NaC$_2$H$_3$O$_2$, KC$_2$H$_3$O$_2$, NaCHO$_2$, KCHO$_2$, mixtures thereof, and mixtures of these with other water soluble salts are acceptable. Sea water is acceptable for preparing the slurries of this invention. The salt can alternatively be dry blended with blast furnace slag and the slurry prepared with fresh water, or salt can be added to a fresh water cement slurry.

Blast furnace slag and salt is preferably provided in a weight ratio of 70:1 to 1:10 of blast furnace slag to salt, and a weight ratio of about 10:1 to 1:1 of blast furnace slag to salt is more preferred.

Acid Functionalized Polymers

In a preferred embodiment, of the present invention, the salt water cement slurry includes an acid functionalized polymer and a crosslinker. Such polymers crosslink through complexes with the acid functionality with crosslinkers such as metal ions from metal oxides to form solid ionomeric systems. The blast furnace slag of the present invention may also function as the crosslinker. Suitable polymer components of such ionomers can be represented by the formula

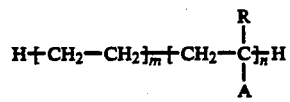

wherein A is selected from the group consisting of:

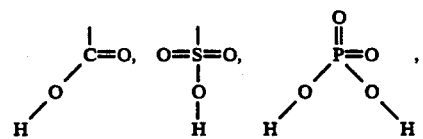

and a mixture of

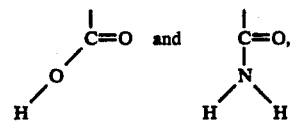

and wherein R is H or a 1–10 carbon atom alkyl radical. The ratio of m to n is generally within the range of 0:1 to 100:1, preferably 0:1 to 10:1. The acid and the hydrocarbon segments of the polymer can be mixed randomly, or in an alternating fashion.

The polymers generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. One of the more preferred polymers is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 1,000 to 250,000, most preferably 10,000 to 100,000. Carboxylate polymer with a low ratio of COOH:C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000–15,000,000 molecular weight are suitable. The copolymers will generally have from 2–99, preferably 5–80, more preferably 10–60 mole percent acid-containing units.

The ionomers suitable for use in the cements and cement slurries of this invention are the water-insoluble reaction product of a proton acceptor metal compound which serves as the cementitious component and a polymer acid component. The metal compound generally is a metal oxide such as CaO, MgO, ZnO or MnO. The preferred metal oxides are magnesium oxide and zinc oxide, and most preferably, magnesium oxide. The applicable metal oxides are generally fired at temperatures above 1,000° F. for several hours to reduce chemical activity prior to grinding to final particle size for use in reacting with the acid component.

In instances where it is desired that the metal compound component add weight to the drilling fluid, the metal compound is preferably a water-insoluble metal compound with a specific gravity of at least 3.0, preferably 3.5. By 'insoluble' is meant that less than 0.01 parts by weight dissolve in 100 parts by weight of cold (room temperature) water.

The poly(carboxylic acid) component can be any water soluble or water dispersable carboxylic acid polymer which will form ionomers. Ionomer forming polymers are well known in the art. Suitable polymers include poly(acrylic acid), poly(methacrylic acid), poly(ethacrylic acid), poly(fumaric acid), poly(maleic acid), poly(itaconic acid) and copolymers such as ethylene/acrylic acid copolymer and ethylene/methacrylic acid copolymer. The copolymers are generally random copolymers.

In some instances, it is preferred to use water dispersable, as opposed to water soluble, polymers. Ideally, in such instances the melting point of the polymer should be higher than the placement temperature (circulating temperature) in the wellbore during the "cementing" operation and lower than the maximum, static temperature of the surrounding formations. It is desirable for the polymer to melt and react after placement as the temperature in the wellbore increases from the circulating temperature to the static temperature of the surrounding formations.

The amount of acid functionalized polymer utilized will vary widely depending upon the carboxylic acid content of the polymer; broadly, 10 to 200, preferably 10 to 100, most preferably 10 to 80wt %, based on the weight of metal compound, can be present. With the polymers having a low ratio of m to n, a smaller amount is required because of the higher functional group content of the polymer. Conversely, with the high ratio of m to n, an amount of polymer toward the higher end of the ranges is preferred.

When the acid functionalized polymers are combined with a polyvalent metal compound, a crosslinked network structure exists as a result of the addition of the second component, thus giving a very strong solid cement. The crosslinking of the polymer can be delayed by substitution of ester functionality for the acid functionality. Ester functionality will hydrolyze forming acid functionality upon exposure to water. Some or all of the acid functionality may be substituted with ester functionality, and preferably more than 50 percent of the acid functionality will be substituted when it is desired to delay the crosslinking.

The particle size of the metal compound component can vary widely. Generally, it will be within the range such that the powder exhibits a surface area within the range of 500 $cm^2/g$ to 30,000 $cm^2/g$, preferably 1,500 $cm^2/g$ to 25,000 $cm^2/g$, most preferably 2,000 $cm^2/g$ to 20,000 $cm^2/g$ all as Blaine specific surface areas.

Preferably, when the acid functionalized polymer is utilized, the metal compound is added first and thereafter at such time as it is desired for the cement to be activated to set, the acid functionalized polymer is added. When universal fluids are utilized, a portion of the total metal compound can be added to the drilling fluid, the remainder being added after dilution when the cementitious slurry is being formed.

In all embodiments of the invention, additional cement can be made and used, in accordance with this invention, for remedial cementing.

The ionomer embodiments of this invention are of particular value for filling and sealing the annulus between a borehole wall and a casing where some degree of ductility and/or tensile strength is desired. The ionomer has good adhesive properties to the borehole wall and casing and has greater elasticity than is obtained with siliceous hydraulic materials such as Portland cement. Thus, such cements are resistant to cracking under conditions of cyclic loading as are frequently encountered in a wellbore. This ductility is particularly important in cementing through salt strata because of the tendency for salt to exist in a deformable plastic state, and slowly flow inward into the borehole.

Another area where the ductility of the ionomer cement is of special value is in slimhole wells where the annulus is smaller. Still yet another area where this ductility is important is in extended reach drilling. The term ,extended reach, is intended to cover horizontal drilling and any other well drilling operations which are off-vertical a sufficient amount to cause the casing to be displaced by gravity toward one side of the borehole.

Blast Furnace Slag Activators

Activators may included in the slurries of the present invention to obtain a reasonable set time. Suitable activators include sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium sulfate, calcium nitrate, calcium nitrite, calcium hydroxide, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to "lbs/bbl" means pounds per barrel of final cement slurry.

A combination of sodium hydroxide and sodium carbonate is a preferred activator. In addition, blast furnace slag can be added as a drilling fluid to a cement. The additional slag can be the activator, especially if the slurry is to be set at an elevated temperature. Each component is an important ingredient for both the drilling fluid and the cement. The PECP is particularly significant in combination with slag since it acts as a retarder and thus provides significant drilling fluid functions in general and specific drilling functions relative to the slag component as well as significant cement functions. PECP also reduces the friction coefficient of muds on casing and filter cake, and pullout forces required to release stuck pipe can be dramatically reduced with PECP in the drilling fluid.

Drilling Process

Process and apparatus used to drill and cement casings within wellbores are well known. A typical practice is as follows. A well is drilled using a hollow drill string having a drill bit with at least one orifice communicating between the inside of the hollow drill string and the outside and located at the lower end of the drill string, thus producing a wellbore. During this drilling, a drilling fluid is circulated down the inside of the drill string and out of the orifice at the lower end thereof. The drilling fluid cools and lubricates the bit and transports cuttings up the wellbore in the annulus surrounding the drill string. When the drilling is complete, the drill string is withdrawn from the wellbore. A first section of well casing, generally having a float shoe with an upper sealing surface, is inserted into the wellbore. Additional sections of casing are generally attached sequentially to the first section and the first section is inserted further into the wellbore. In accordance with one embodiment of this invention, additional drilling fluid, containing additives necessary to form a cementitious slurry, is pumped down the casing. This may be facilitated by inserting a bottom plug into the casing string, the bottom plug having a longitudinal passage and a rupturable diaphragm at the top, so that it is forced down the casing by the cementitious slurry. Thereafter, a top or second plug can be inserted into the casing string above the column of cementitious slurry, the diaphragm of the first plug ruptured, and the slurry forced up into an annulus between the outside of the casing and the inside of the borehole where, with time, it hardens.

In one embodiment the drilling fluid consists essentially of blast furnace slag, salt and water-based drilling fluid components, and is pumped exclusively using the piping and pumps associated with the drilling rig without the need for any pumps designed for pumping cement. This is possible with the blast furnace slag based cements due to the improved control of setting.

In a preferred embodiment of the present invention, the cement slurry is placed in the wellbore prior to inserting the casing into the wellbore. Placing the cement slurry into the wellbore prior to inserting the casing eliminates difficulty in displacing drilling fluids with cement slurry in portions of the borehole where the casing is poorly centralized. When the casing is poorly centralized, it is difficult to get the cement slurry in the narrow portion of the annulus. This results in a vertical channel that allows communication up the wellbore after the cement sets by placing the cement slurry into the wellbore prior to inserting the casing, these vertical channels will therefore be avoided even if the casing is poorly centralized. The use of blast furnace slag based cement slurry facilitates the use of this procedure because setting of the blast furnace slag based cement slurries can be retarded so that the casing can be inserted into the slurry and yet still form a strong cement within a reasonable time.

Mixed Metal Hydroxides

Mixed metal hydroxides are preferably used in the drilling fluid and cement slurry when it is necessary to impart thixotropic properties to the drilling fluid or the cement slurry. The mixed metal hydroxides provide excellent solids suspension. This, in combination with the settable filter cake provided by the use of universal fluid, greatly enhances the cementing in a restricted annulus. The mixed metal hydroxides are particularly effective in muds containing clay such as sodium bentonite. Preferred systems thickened in this way contain from 1–20 lbs/bbl of clay such as bentonite, preferably 7 to 12 lbs/bbl, most preferably 0.1 to 2 lbs/bbl. The mixed metal hydroxides are generally present in an amount within the range of 0.1 to 2 lbs/bbl of total drilling fluid, most preferably 0.7 to 1.2 lbs/bbl. Mixed metal hydroxides are known in the art and are trivalent metal hydroxide-containing compositions such as $MgAl(OH)_{4.7}Cl_{0.3}$. They conform essentially to the formula

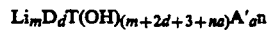
$$Li_m D_d T(OH)_{(m+2d+3+na)} A'_a{}^n$$

where
  m represents the number of Li ions present; the said amount being in the range of zero to about 1;
  D represents divalent metals ions; with
  d representing the amount of D ions in the range of zero to about 4;
  T represents trivalent metal ions;
  A' represents monovalent or polyvalent anions of valence $-n$,
  other than $OH^-$, with a being the amount of A' anions; and where $(m+2d+3+na)$ is equal to or greater than 3. A more detailed description can be found in Burba, U.S. Pat. No. 4,664,843 (May 12, 1987). The mixed metal hydroxides in the drilling fluid, in combination with blast furnace slag, tend to set to a cement having considerable strength in a comparatively short time, i.e., about one-half hour at temperatures as low as 100° F. This can be a major asset in some applications.

In some instances, it may be desirable to use a material which functions as a retarder along with the activator because of the need for other effects brought about by the retarder. For instance, a chromium lignosulfonate may be used as a thinner along with the activator even though it also functions as a retarder to setting of blast furnace slag cements.

Retarders known to be effective to delay setting of Portland cements are also effective in delaying the setting of the blast furnace slag slurries. Weak organic acids, such as acetic acid and citric acid, can therefore be included in the slurry compositions when it is necessary to delay setting of the cement slurry.

Other suitable thinners that may be useful in the cement slurries of this invention include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, a phenol sulfonate, dodecylbenzene sulfonate, and mixtures thereof.

The amount of blast furnace slag present in the universal fluid is generally within the range of 1 to 100 lbs/bbl of final drilling fluid, preferably 10 to 80 lbs/bbl, most preferably 20 to 50 lbs/bbl. When ionomers are utilized, the amount of metal compound initially present in universal fluid can also vary widely. Generally, 1 to 500 lbs/bbl, preferably 50 to 300 lbs/bbl, most preferably 100 to 250 lbs/bbl of the metal compound are used.

Drilling Fluids

In one embodiment of this invention, the cement slurry is preferably prepared from a drilling fluid that has been used to drill the wellbore. The initial drilling fluid or mud can be either a conventional drilling fluid, i.e., one not containing a blast furnace slag, or it can be one already containing a blast furnace slag in a relatively small amount. The drilling fluid can be either a water-based fluid or an oil-based fluid, but preferably, any aqueous phase present is salt saturated. The term 'water-based fluid' is intended to encompass both fresh water muds, salt water containing muds, whether made from seawater or brine, and other muds having water as the continuous phase including oil-in-water emulsions. The use of saturated salt solutions for the preparation of the cement slurry additionally increases the compressive strength of the set cement. About 20 to 27 wt % sodium chloride, based on the water in the slurry, is most preferably used. One suitable source is to use seawater or a brine solution, although sodium chloride could be added. This is contrary to what would be expected in view of the intolerance of Portland cement to brine. Various salts are suitable for use in the drilling fluid used in this invention in addition to, or instead of sodium chloride, including, but not limited to, NaBr, KBr, KCl, $CaCl_2$, $MgCl_2$, $NaNO_3$, $KNO_3$, $NaC_2H_3O_2$, $KC_2H_3O_2$, $NaCHO_2$ and $KCHO_2$, mixtures therof and mixtures of these with other water soluble salts. The term 'oil-based fluids' as used herein includes fluids having oil as the continuous phase, including low water content oil-base mud and invert oil-emulsion mud.

The term 'universal fluid' is used herein to designate those compositions containing cementitious material, which compositions are suitable for use as a drilling fluid, and which compositions thereafter can contain additional cementitious material and/or activators such as accelerators and/or acid or ester functionalized polymers added to give a cementitious slurry.

An embodiment of this invention utilizing universal fluid is accomplished by preparing a universal fluid by mixing a salt containing drilling fluid or drilling mud and blast furnace slag; drilling a borehole with the universal fluid thereby laying down a settable filter cake on the walls of the borehole during drilling of the well; adding additional blast furnace slag and/or accelerators (or reactive second components) and introducing the thus-formed salt containing cementitious slurry through the casing, and out the bottom of the casing into an annulus between the wellbore and a casing where it hardens forming a good bond with the filter cake. The filter cake, with time, actually hardens itself because of the presence of cementitious material therein. This hardening is facilitated by any accelerators which may be present in the cementitious slurry and which migrate by diffusion and/or filtration into the filter cake.

In accordance with the invention that utilizes universal fluid, the fluid itself becomes a part of the final cement and thus, this portion of the drilling fluid does not need to be disposed when drilling is completed.

Drilling Fluid Additives

Additives that are generally useful in drilling fluids may optionally be included in drilling fluids in the embodiments of this invention incorporating drilling fluids. Suitable fluid loss additives found in drilling fluids include bentonite clay, carboxymethylated starches, starches, carboxymethyl cellulose, synthetic resins such as "POLYDRILL" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

Universal Fluids

In another embodiment of this invention, most or all of the components of the drilling fluid are chosen such that they have a function in the cementitious material also. The following Table A illustrates the uniqueness of such formulations.

TABLE A

| | Function | | | |
| --- | --- | --- | --- | --- |
| | Drilling Fluid | | Cementitious Solid | |
| Additive | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |
| Biopolymer[3] | Viscosity | | Viscosity | Retarder |
| Silicate | Viscosity | Shale stabilizer | Accelerator | — |
| Carbohydrate polymer[4] | Deflocculant | — | Retarder | Deflocculant |
| Barite[5] | Density | — | Density concentration | Solids |
| Bentonite[6] | Fluid loss control | — | Fluid loss control | Solids concentr. |
| Clay/Quartz dust[7] | — | — | Solids concentration | — |
| Metal Component[8] | Cuttings stabilizer | — | Cement component | Solids |
| Functional Group Polymer | Not Present | Not Present | Cement component | — |
| Lime | Cuttings and wellbore stabilizer | Alkalinity | Accelerator concentration | Solids |
| PECP[9] | Shale stabilizer | Fluid loss | Retarder | Rheological control |
| NaCl | Shale | — | — | — |

TABLE A-continued

| Additive | Function | | | |
|---|---|---|---|---|
| | Drilling Fluid | | Cementitious Solid | |
| | Primary | Secondary | Primary | Secondary |
| stabilizer | | | | |

[1] Polydrill, A synthetic polymer manufactured by SKW Chemicals Inc. under trade name Polydrill, for instance.
[2] Starch made by Milpark Inc. under the trade name "PERMALOSE", for instance.
[3] A biopolymer made by Kelco Oil Field Group, Inc., under the trade name "BIO-ZAN" for instance.
[4] Water-soluble carbohydrate polymer manufactured by Grain Processing Co. under trade name "MOR-REX".
[5] Barite is BaSO$_4$, a drilling fluid weighting agent.
[6] Bentonite is clay or colloidal clay thickening agent.
[7] Clay/quartz solid dust manufactured by MilWhite Corp. under the trade name "REVDUST", for instance.
[8] Blast furnace slag manufactured by Blue Circle Atlantic Co. under the trade name "NEWCEM" is suitable.
[9] Polycyclicpolyetherpolyol The material in the above Table A labeled PECP is of special significance in connection with embodiments of this invention relating to slurries formed from drilling fluids and used in the cementing of wellbores. This refers to a polyhydric alcohol most preferably a polycyclicpolyetherpolyol. A general chemical composition formula representative of one class of these materials is as follows:

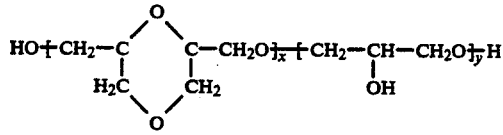

where $x \geq 1$ and $y \geq 0$.

A more complete description of these polycyclicpolyetherpolyols is found in the Hale and Cowan patent, U.S. Pat. No. 5,058,679 (Oct. 22, 1991), referred to hereinabove, the disclosure of which is incorporated herein by reference.

The unique advantage of universal fluids is that wellbore stabilization, fluid-loss control, and cuttings transport can be realized essentially the same as with conventional drilling fluid systems. However, with the simple presence of activators in the subsequent cementitious slurry, the resulting mud-slag system will develop strength. Thus, for instance, (1) drilling fluid filter cake deposited while drilling over permeable zones can be converted into an effective sealant by diffusion of activators from the mud-slag column; and (2), whole mud that has not been removed from washed-out sections of the hole during displacement will harden with time and, therefore, provide an effective sealant and lateral support to the casing.

In areas such as slim hole drilling, the ionomer universal fluid gives the process benefit of avoiding the removal of an incompatible drilling mud and the product benefit of being resistant to deflection when set.

In the case of the universal fluids, the amount of cementitious material can vary considerably and also can vary depending upon whether the cementitious component is a siliceous material, an organometal, or a polyphosphate.

Bonding Surfactants

Surfactants, alcohols, or blends thereof may be used in the drilling fluids in the embodiments of this invention utilizing drilling fluid; and in the cement slurries of this invention to improve bonding to the casing. The surfactants may be anionic, cationic, nonionic, amphoteric, or blends thereof, e.g., nonionics with anionic or cationic surfactants.

The following surfactants, classes of surfactants, and mixtures of surfactants are particularly useful:

Alkanol amides (nonionic);
Ethoxylated alkylarylsulfonate;
Amine oxides (nonionic);
Ethoxylated Alcohols (nonionic);
Sulfates and Sulfonates of Ethoxylated Alcohols (anionic);
Ethoxylated Alkyl Phenols (nonionic);
Sulfates or Sulfonates of Ethoxylated Alkyl Phenols (and their salts) (anionic);
Fluorocarbon-based Surfactants (nonionic, amphoteric, anionic);
Phosphate Derivatives of Ethoxylated Alcohols;
Quaternary Ammonium Chloride (cationic);
Sulfates or Sulfonates of Alcohols (and their salts)(Anionic); and
Condensation Products of Ethylene Oxide and Propylene Glycol (nonionic).

The surfactants or mixtures of surfactants should be soluble in the cement slurry and not precipitate or otherwise degrade under the action of the ions in the cement slurry (e.g., resistant to calcium and other electrolytes) and the temperature and pressure conditions occurring during the placement and curing of the cement.

Especially preferred are nonylphenol ethoxylates, cocoamido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}$–$C_{15}$ linear alcohol ethoxylate sulfate, $C_9$–$C_{11}$ linear alcohol ethoxylate sulfates, sodium lauryl sulfate, and ethoxy alcohol sulfates.

The concentration of surfactant in the water phase used to prepare the slurry will generally be from about 0.1 to about 5% by weight, and more preferably from about 0.2 to about 3% by weight; excellent results have been obtained with concentrations between about 1.17 and about 2.33% by volume.

Alcohols

Polyhydric alcohols may be included in drilling fluids in the embodiments of this invention utilizing drilling fluids and in the cement slurries of the present invention. The following alcohols may be used alone or in blends with the preceding surfactants. The polyalcohol ingredients of drilling fluids containing polyalcohols are preferably acyclic polyols having at least two carbon atoms and 2 hydroxyl groups but no more than 18 carbon atoms and 13 hydroxyl groups. Preferably, the polyols of the invention have at least 2 carbon atoms and 2 hydroxyl groups, but no more than 9 carbon atoms and 7 hydroxyl groups.

The alcohols or mixtures of alcohols should be soluble in the drilling fluid of this invention at the temperature and pressure conditions occurring in the wellbore or can be solubilized as described infra. Additionally, the alcohols or mixtures of alcohols should not precipitate or otherwise degrade under the actions of the ions in a drilling fluid (e.g., resistant to calcium and electrolytes) and the temperature and pressure conditions occurring during drilling. The alcohols may also be soluble at the ambient temperature and pressure conditions on the surface during the preparation of a drilling fluid.

The concentration of alcohol in the water phase used to prepare the drilling fluid of this invention will generally be at least about 2% by weight and preferably from about 2 to about 30% by weight based on the water phase and more preferable from about 5 to about 15% by weight; excellent results have been obtained with concentrations between about 10 and about 20% by weight. Preferably at least about 1% w of the alcohol is cyclicetherpolyol or acyclic polyol, based on the total weight of the alcohol.

EXAMPLE

The improvement imparted by use of saturated salt water in a blast furnace slag cement slurry was determined by preparing six blast furnace slag cement slurries, three with fresh water and three with a brine from a west Texas brine well. One fresh water and one brine slurry was prepared from each of three types of blast furnace slag. Each slurry contained 500 grams of blast furnace slag and 350 ml of liquid (water or brine). The slurries each developed compressive strengths of 500 psi or greater within 15 hours. Cements from the saturated salt slurries ultimately had more than 50 percent greater compressive strengths than the corresponding cements from fresh water slurries for two of the three blast furnace slags. Table 1 summarizes the components and resulting compressive strengths from the slurries.

TABLE 1

| Sample | Slag | Water | Compressive Strength - psi | Time for Comp. Strength - hrs |
|---|---|---|---|---|
| 1 | NEWCEM[1] | Fresh | 566 | 23 |
| 2 | NEWCEM | Salt | 977 | 23 |
| 3 | KOCH[2] | Fresh | 1265 | 120 |
| 4 | KOCH | Salt | 2457 | 120 |
| 5 | MC100[3] | Fresh | 1392 | 120 |
| 6 | MC100 | Salt | 1392 | 120 |

[1]NEWCEM is a blast furnace slag available form Blue Circle Cement Company that has about a 5,500 cm$^2$/g Blaine specific surface area.
[2]WELL-CEM a 10,040 cm$^2$/g Blaine specific surface area slag available from Koch Minerals of Wichita, Kansas.
[3]MICROFINE MC100 is an ultra fine grain blast furnace slag having a 10,990 cm$^2$/g Blaine surface area available from Geochemical Corporation.

This example demonstrates that the presence of salt, even in high concentrations, is not detrimental to compressive strength of blast furnace slag cements, and for most blast furnace slag cements, the compressive strength is considerably improved by inclusion of salt in the slurry.

While this invention has been described in detail for the purpose of illustration, it is not to be construed as limited thereby, but is intended to cover all the changes and modifications within the spirit and the scope thereof.

We claim:

1. An aqueous cementitious slurry comprising:
   20–600 lbs/bbl of said slurry of blast furnace slag having a 30–40 wt percent $SiO_2$ content;
   a drilling fluid comprising an aqueous phase and clay; and salt;
   wherein said drilling fluid is present in said slurry in an amount sufficient to provide an amount of clay effective to act as a fluid loss control agent in said slurry;
   wherein said salt is present in said slurry in an amount sufficient to give a weight ratio of said blast furnace slag to said salt in said slurry within the range of 70:1 to 1:10; and
   wherein water is present in an amount sufficient to produce said aqueous cementitious slurry.

2. A slurry in accordance with claim 1 wherein said salt is selected from the group consisting of NaCl, NaBr, $CaCl_2$, $MgCl_2$, $NaNO_3$, $NaC_2H_3O_2$, KCl, KBr, $KNO_3$, $KC_2H_3O_2$, $NaCHO_2$, $KCHO_2$ and mixtures thereof.

3. A slurry in accordance with claim 1 wherein said slurry comprises at least 5 percent by weight of said salt and said clay is bentonite.

4. A slurry in accordance with claim 3 wherein said salt is sodium chloride and wherein said slurry contains an amount of sodium chloride effective to saturate said slurry.

5. A slurry in accordance with claim 1 wherein said blast furnace slag has a particle size such that it exhibits a Blaine specific surface area between about 3,000 and about 15,000 cm$^2$/g.

6. A slurry in accordance with claim 1 wherein said blast furnace slag is essentially the only hydraulic material in said cementitious slurry.

7. A slurry in accordance with claim 1 further comprising a polymer containing acid functional groups and a crosslinker.

8. A slurry in accordance with claim 7 wherein said crosslinker is a metal oxide.

9. A slurry in accordance with claim 7 wherein said polymer is of the formula:

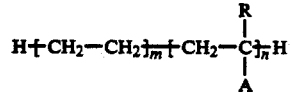

wherein A is selected from the group consisting of:

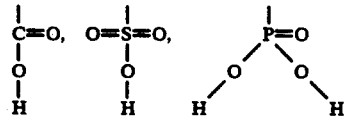

and a mixture of

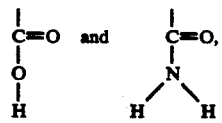

and wherein R is H or a 1-10 carbon atom alkyl radical, and wherein said polymer has a weight average molecular weight within the range of 10,000 to 100,000.

10. A slurry in accordance with claim 1 wherein the particle size distribution of said blast furnace slag is such that at least two nodes are exhibited on a plot of particle size vs. percent of particles of that size.

11. A slurry in accordance with claim 1 wherein said blast furnace slag is a blast furnace slag which exhibits about a 20 percent or more increase in compressive strength when set with saturated salt water as opposed to being set with fresh water.

12. A slurry in accordance with claim 1 further comprising 0.1 to 5 weight per cent based on the weight of said water of a bonding surfactant selected from the group consisting of alkanol amides; ethoxylated alkylarylsulfonate; amine oxides; ethoxylated alcohols; sulfates and sulfonates of ethoxylated alcohols; ethoxylated alkyl phenols; sulfates or sulfonates of ethoxylated alkyl phenols; fluorocarbon-based surfactants; phosphate derivatives of ethoxylated alcohols; quaternary ammonium chloride; sulfates or sulfonates of alcohols; and condensation products of ethylene oxide and propylene glycol.

13. A slurry in accordance with claim 1 wherein said clay is bentonite, said slurry comprises at least 5 percent by weight of said salt and wherein said slurry further comprises an activator effective for causing said blast furnace slag to hydrate, said activator being selected from the group consisting of sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide lithium carbonate, calcium oxide, calcium sulfate, calcium nitrate, calcium nitrite, calcium hydroxide, sodium sulfate and mixtures thereof.

14. A slurry in accordance with claim 13 wherein said activator comprises 2-6 lbs/bbl of caustic soda and 2-20 lbs/bbl of soda ash per barrel of said slurry.

15. A slurry in accordance with claim 14 comprising in addition a chromium lignosulfonate in an amount effective to retard the setting of said slurry.

16. A slurry in accordance with claim 1 comprising in addition 2 to 30 per cent by weight based on the weight of said water of a polyalcohol.

17. A slurry in accordance with claim 16 wherein said polyalcohol comprises a polyethercyclicpolyol.

18. A slurry in accordance with claim 1 wherein said blast furnace slag is produced by water quenching and has a particle size such that it exhibits a Blaine specific surface area between 4,000 and 9,000 $cm^2/g$.

19. A slurry in accordance with claim 1 wherein said drilling fluid is a used drilling fluid.

20. A cement produced by curing an aqueous cementitious slurry comprising:
  20-600 lbs/bbl of said slurry of blast furnace slag having a 30-40 wt percent $SiO_2$ content;
  a drilling fluid comprising an aqueous phase and clay; and salt;
  wherein said drilling fluid is present in said slurry in an amount sufficient to provide an amount of clay effective to act as a fluid loss control agent in said slurry;
  wherein said salt is present in said slurry in an amount sufficient to give a weight ratio of said blast furnace slag to said salt in said slurry within the range of 70:1 to 1:10; and
  wherein water is present in an amount sufficient to produce said aqueous cementitious slurry.

* * * * *

UNITED STATES PATENT AND TRADEMARK OFFICE
CERTIFICATE OF CORRECTION

PATENT NO. : 5,284,513
DATED : February 8, 1994
INVENTOR(S) : Kenneth M. Cowan, et. al.

It is certified that error appears in the above-indentified patent and that said Letters Patent is hereby corrected as shown below:

Title page, item [73], add the following: Assignee, --Shell Oil Company, Houston, Tex.--

Signed and Sealed this

Nineteenth Day of July, 1994

Attest:

BRUCE LEHMAN

Attesting Officer     Commissioner of Patents and Trademarks